United States Patent
Takahashi et al.

(10) Patent No.: US 11,034,225 B2
(45) Date of Patent: Jun. 15, 2021

(54) VEHICLE DOOR SEAL STRUCTURE

(71) Applicants: MAZDA MOTOR CORPORATION, Hiroshima (JP); KATAYAMA KOGYO CO., LTD., Okayama (JP)

(72) Inventors: Nobuyuki Takahashi, Hiroshima (JP); Hiroaki Yokoyama, Ibara (JP); Takashi Moriya, Ibara (JP)

(73) Assignees: MAZDA MOTOR CORPORATION, Hiroshima (JP); KATAYAMA KOGYO CO., LTD., Okayama (JP)

( * ) Notice: Subject to any disclaimer, the term of this patent is extended or adjusted under 35 U.S.C. 154(b) by 236 days.

(21) Appl. No.: 16/173,318

(22) Filed: Oct. 29, 2018

(65) Prior Publication Data
US 2019/0160929 A1    May 30, 2019

(30) Foreign Application Priority Data
Nov. 28, 2017  (JP) .............................. JP2017-227625

(51) Int. Cl.
*B60J 10/75*  (2016.01)
*B60J 10/248*  (2016.01)

(52) U.S. Cl.
CPC .............. *B60J 10/75* (2016.02); *B60J 10/248* (2016.02)

(58) Field of Classification Search
CPC .................. B60J 10/75; B60J 10/248
See application file for complete search history.

(56) References Cited

U.S. PATENT DOCUMENTS

| | | | |
|---|---|---|---|
| 5,199,760 A * | 4/1993 | Vering | B60J 10/265 296/146.16 |
| 5,870,860 A * | 2/1999 | Heller | B60S 1/0411 49/377 |
| 6,119,404 A * | 9/2000 | Bschorr | B60J 10/00 49/490.1 |
| 7,052,021 B2 * | 5/2006 | Plottnik | B60J 10/24 277/642 |
| 8,266,841 B2 * | 9/2012 | Grudzinski | B60J 10/40 49/377 |
| 8,402,696 B2 * | 3/2013 | Iwasa | B60J 10/248 49/490.1 |
| 8,910,423 B2 * | 12/2014 | Lee | B60J 10/75 49/498.1 |
| 9,038,319 B2 * | 5/2015 | Kuwahara | B60J 10/20 49/498.1 |
| 9,919,590 B2 * | 3/2018 | Nojiri | B60J 10/32 |

(Continued)

FOREIGN PATENT DOCUMENTS

| | | |
|---|---|---|
| DE | 2228061 A1 | 12/1973 |
| EP | 0842059 A1 | 5/1998 |

(Continued)

*Primary Examiner* — Catherine A Kelly
(74) *Attorney, Agent, or Firm* — Studebaker & Brackett PC (57) ABSTRACT

In a vehicle door seal structure in which an outer side weather strip whose tip end portion extends upward from a molding side base end portion toward a door window glass is formed integrally with a molding portion provided on a vehicle outer side of a belt line portion, at least an outer side weather strip positioned at the uppermost portion is configured such that a first hollow portion is formed from the base end portion to the tip end portion and a second hollow portion is formed below the first hollow portion at the base end portion.

14 Claims, 6 Drawing Sheets

(56) References Cited

U.S. PATENT DOCUMENTS 10,093,160 B2 * 10/2018 Nojiri ...................... B60J 10/84
10,252,604 B2 * 4/2019 Sugawa ................... B60J 10/23

FOREIGN PATENT DOCUMENTS

| EP | 0854062 A1 | | 7/1998 | |
| JP | 2002219944 A | * | 8/2002 | ............. B60J 10/75 |
| JP | 2010-036590 A | | 2/2010 | |

* cited by examiner

FIG.4
-Comparative Example-

VEHICLE DOOR SEAL STRUCTURE

CROSS-REFERENCE TO RELATED APPLICATIONS

This application claims priority to Japanese Patent Application No. 2017-227625 filed to JPO on Nov. 28, 2017 under 35 U.S.C 119, the entire disclosure of which is incorporated herein.

BACKGROUND

The present invention relates to a vehicle door seal structure in which an outer side weather strip whose tip end portion extends upward from a molding side base end portion toward a door window glass is formed integrally with a molding portion provided on a vehicle outer side of a belt line portion.

Typically, a portion between a belt line portion of a side door and a door window glass is sealed by a molding portion provided on a vehicle outer side of the belt line portion and an outer side weather strip (a so-called seal portion) whose tip end portion extends upward from a molding side base end portion toward the door window glass.

Figure 6:
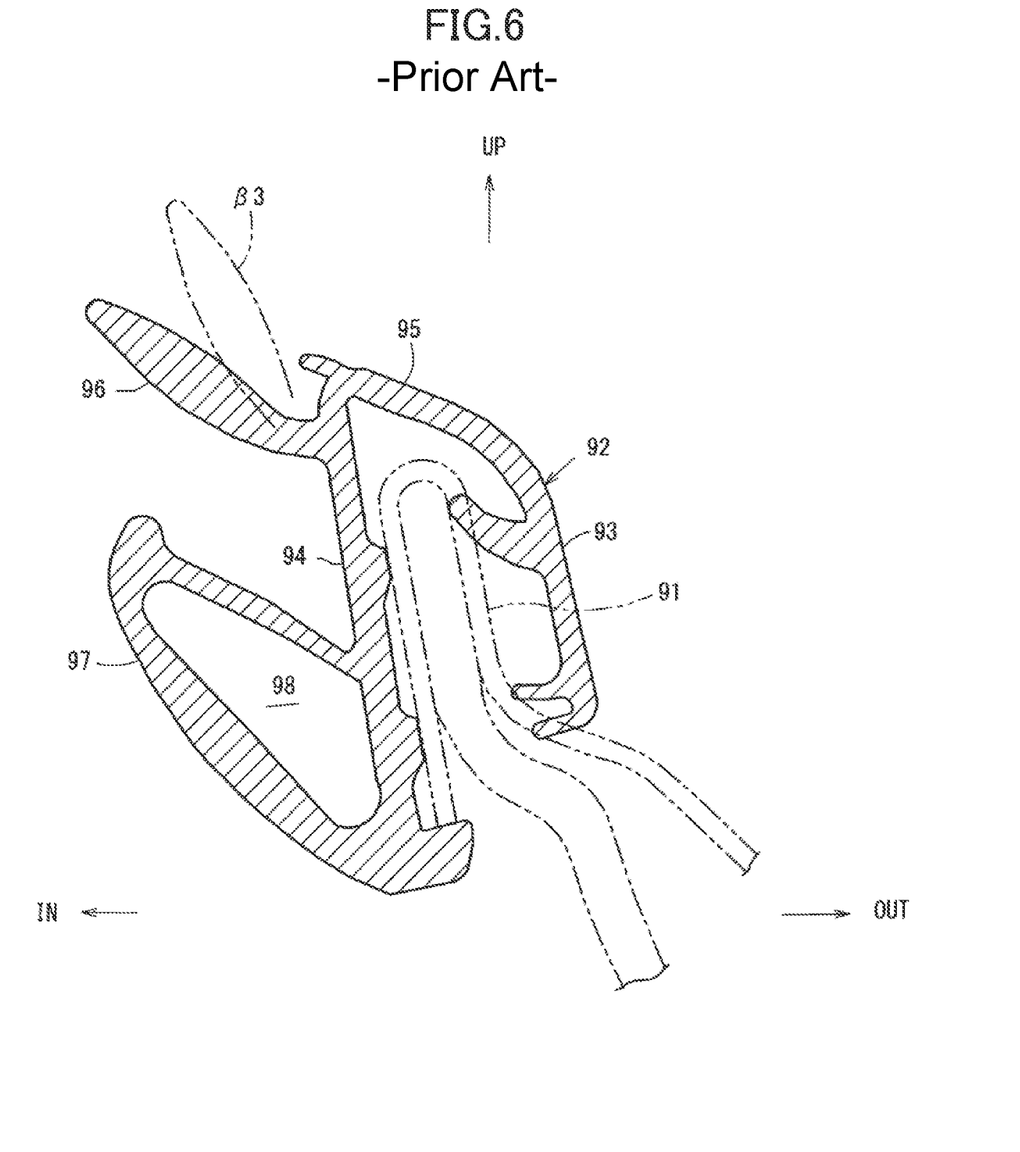
FIG. 6 is a sectional view of a typical example of the seal structure of the vehicle door.

That is, as in a vehicle door seal structure of Japanese Unexamined Patent Application Publication No. 2010-36590 in FIG. 6, a belt line molding 92 is attached to an upper end of a door outer panel 91 in this seal structure.

As illustrated in FIG. 6, the belt line molding 92 is configured such that a vehicle outer side wall 93 and a vehicle inner side wall 94 are integrally formed in an inverted U-shaped section through a coupling portion 95. Two-stage upper and lower seal portions 96, 97 whose tip end portions extend upward from the vehicle inner side wall 94 as a molding side base end portion to a door window glass side are formed integrally with the molding side base end portion.

The seal portion 96 positioned on the upper side is formed with a non-hollow structure (a solid structure) having a tongue-shaped section, and the seal portion 97 positioned on the lower side is formed with a hollow structure in which a hollow portion 98 is formed.

Favorable swing prevention of a door window glass is realized by the two-stage upper and lower seal portions 96, 97, specifically the seal portion 97 with the hollow structure.

In the typical vehicle door seal structure illustrated in FIG. 6, the seal portion 96 with the non-hollow structure having the tongue-shaped section is provided above the seal portion 97 with the hollow structure. Thus, upon lifting of the door window glass, the seal portion 96 protrudes upward beyond an upper end of the coupling portion 95 as indicated by a virtual line β3 in FIG. 6, and therefore, sideward visibility (downward visibility from the inside of a vehicle compartment to a vehicle outer side) is narrowed. In addition, appearance is worsened due to such protrusion. Thus, there is room for improvement.

SUMMARY

For these reasons, the present invention is intended to provide a vehicle door seal structure in which a margin for lifting of an upper end of an outer side weather strip as a seal portion upon lifting of a door window glass is decreased to suppress narrowing of sideward visibility and to prevent worsening of appearance from a vehicle outer side.

The vehicle door seal structure of the present invention is a vehicle door seal structure in which an outer side weather strip whose tip end portion extends upward from a molding side base end portion toward a door window glass is formed integrally with a molding portion provided on a vehicle outer side of a belt line portion. At least an outer side weather strip positioned at the uppermost portion is configured such that a first hollow portion is formed from the base end portion to the tip end portion and a second hollow portion is formed below the first hollow portion at the base end portion.

According to the above-described configuration, the second hollow portion is provided below the first hollow portion at the base end portion. Thus, the pivot point of the outer side weather strip (a so-called draining lip) when the door window glass is lifted to contact the outer side weather strip can be set to right above the second hollow portion, and accordingly, a pivot radius from the pivot point to the upper end of the outer side weather strip is decreased.

Thus, a margin for lifting by pivoting of the upper end of the outer side weather strip upon lifting of the door window glass can be decreased, and narrowing of sideward visibility can be suppressed. In addition, worsening of appearance from the vehicle outer side can be prevented.

In one embodiment of the present invention, the second hollow portion is formed in a tapered shape from the base end portion to the tip end portion.

According to the above-described configuration, stiffness of a tip end portion of the second hollow portion in the outer side weather strip can be improved, and therefore, the outer side weather strip can turn about such a portion (the pivot point).

In one embodiment of the present invention, a partition wall portion separating the first hollow portion and the second hollow portion extends upward toward the door window glass from the base end portion to the tip end portion.

According to the above-described configuration, the following advantageous effects are provided.

That is, the door window glass is arranged inclined slightly such that a lower end portion is positioned outside in a vehicle width direction with respect to an upper end. When the door window glass is lifted such that the upper end contacts a corresponding upper door sash and the lower end portion of the door window glass is pressed upward by a window regulator, outward biasing force in the vehicle width direction is applied to the door window glass.

The partition wall portion extends upward toward the door window glass from a base end portion to a tip end portion. Thus, in lifting of the door window glass, when the outward biasing force in the vehicle width direction as described above is applied to the door window glass, the partition wall portion does not interfere with a certain degree of upward deformation of the tip end portion of the second hollow portion in the outer side weather strip.

In one embodiment of the present invention, the thickness of the partition wall portion is formed thinner than the thickness of an outer wall portion positioned on a door window glass side of each hollow portion.

According to the above-described configuration, the thickness of the partition wall portion is set as described above, and therefore, an excessive increase in stiffness of the base end side of the outer side weather strip, specifically the vicinity of the second hollow portion, can be suppressed.

In one embodiment of the present invention, the outer side weather strip includes, at an upper end of the first hollow portion, a horizontal wall portion extending substantially horizontally in the vehicle width direction, and includes, at an end portion of the horizontal wall portion on the vehicle outer side, a stopper portion protruding toward the molding portion.

According to the above-described configuration, when the outer side weather strip pivots about the pivot point, the stopper portion contacts the molding portion, and the force of pressing the door window glass by the outer side weather strip is obtained.

In one embodiment of the present invention, the upper end of the outer side weather strip is set at a height substantially identical to that of an upper end portion of the molding portion.

According to the above-described configuration, there is almost no upward protrusion of the upper end of the outer side weather strip beyond the belt line portion. Thus, worsening of the downward visibility (the so-called sideward visibility) from the inside of a vehicle compartment to the vehicle outer side can be suppressed, and appearance from the vehicle outer side can be improved.

DETAILED DESCRIPTION

The purpose for decreasing a margin for lifting of an upper end of an outer side weather strip upon lifting of a door window glass to suppress narrowing of sideward visibility and prevent worsening of appearance from a vehicle outer side is realized by a vehicle door seal structure in which an outer side weather strip whose tip end portion extends upward from a molding side base end portion toward a door window glass is formed integrally with a molding portion provided on a vehicle outer side of a belt line portion. In this structure, at least an outer side weather strip positioned at the uppermost portion is configured such that a first hollow portion is formed from the base end portion to the tip end portion and a second hollow portion is formed below the first hollow portion at the base end portion.

First Embodiment

One embodiment of the present invention will be described below in detail with reference to the drawings.

Figure 1:
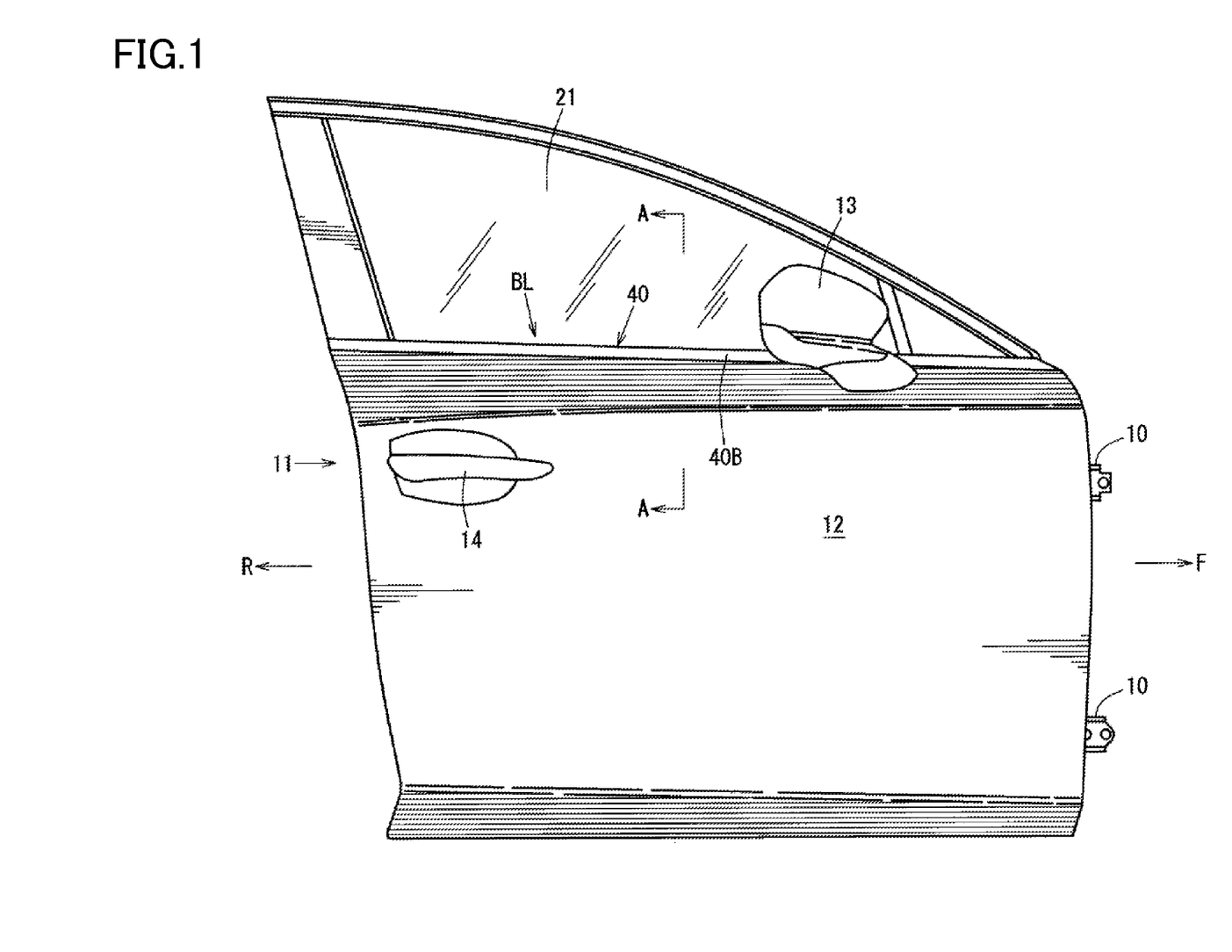
FIG. 1 is a side view of a vehicle door including a seal structure of the present invention.

The drawings illustrate a seal structure of a vehicle door. FIG. 1 is a side view of the vehicle door having the seal structure, FIG. 2 is a sectional view from arrows A of FIG. 1, and FIG. 3 is an enlarged view of a main portion of FIG. 2.

Note that in the present embodiment, a front door on a vehicle right side is described.

In FIG. 1, a front door 11 is openably supported on a vehicle body side hinge pillar through a pair of upper and lower door hinge brackets 10. A door mirror 13 for checking a rear side is attached to an upper front portion of a door outer panel 12 forming an outer plate of the front door 11, and a door outer handle 14 is provided at an upper rear portion of the door outer panel 12.

Figure 2:
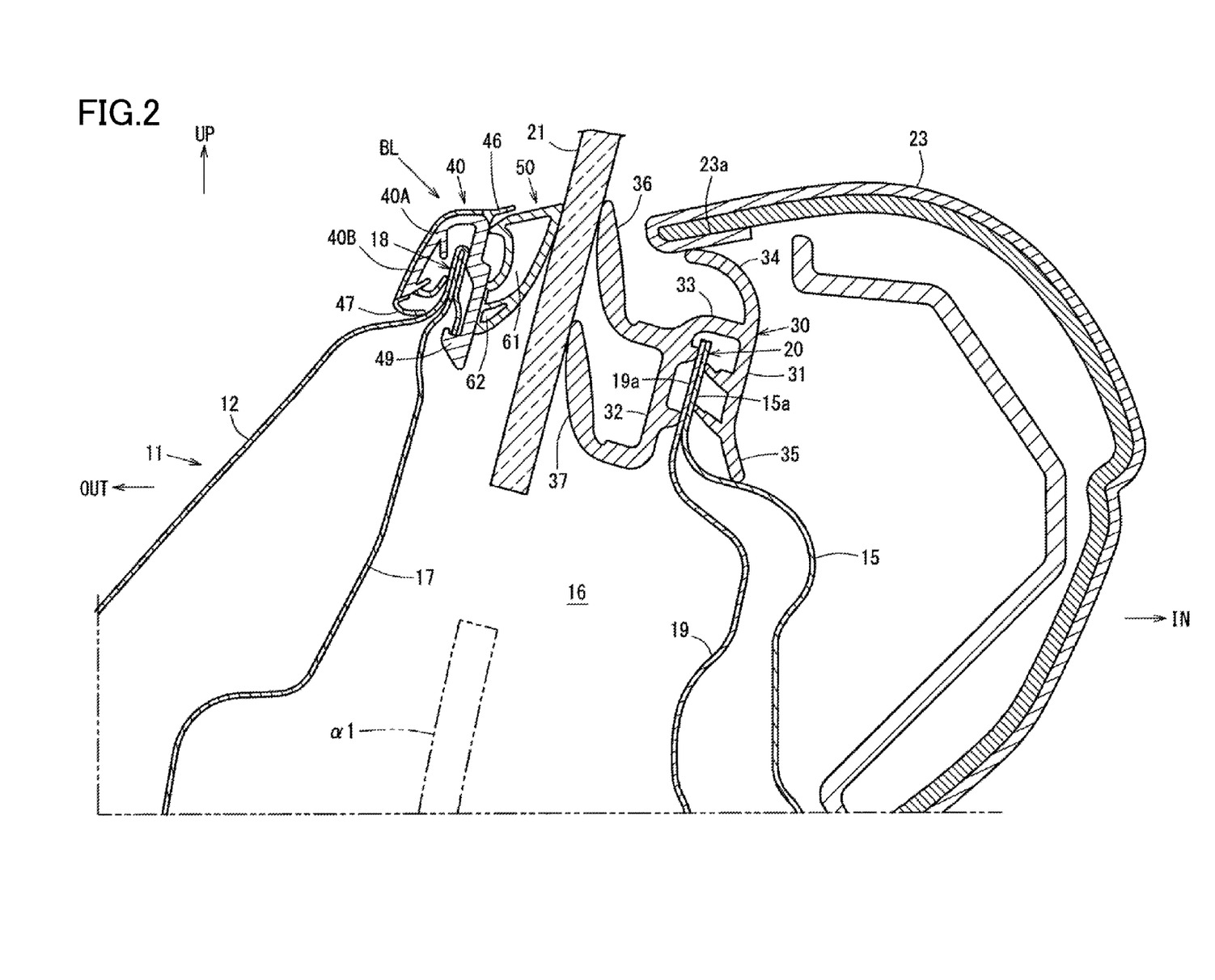
FIG. 2 is a sectional view from arrows A of FIG. 1.
Figure 3:
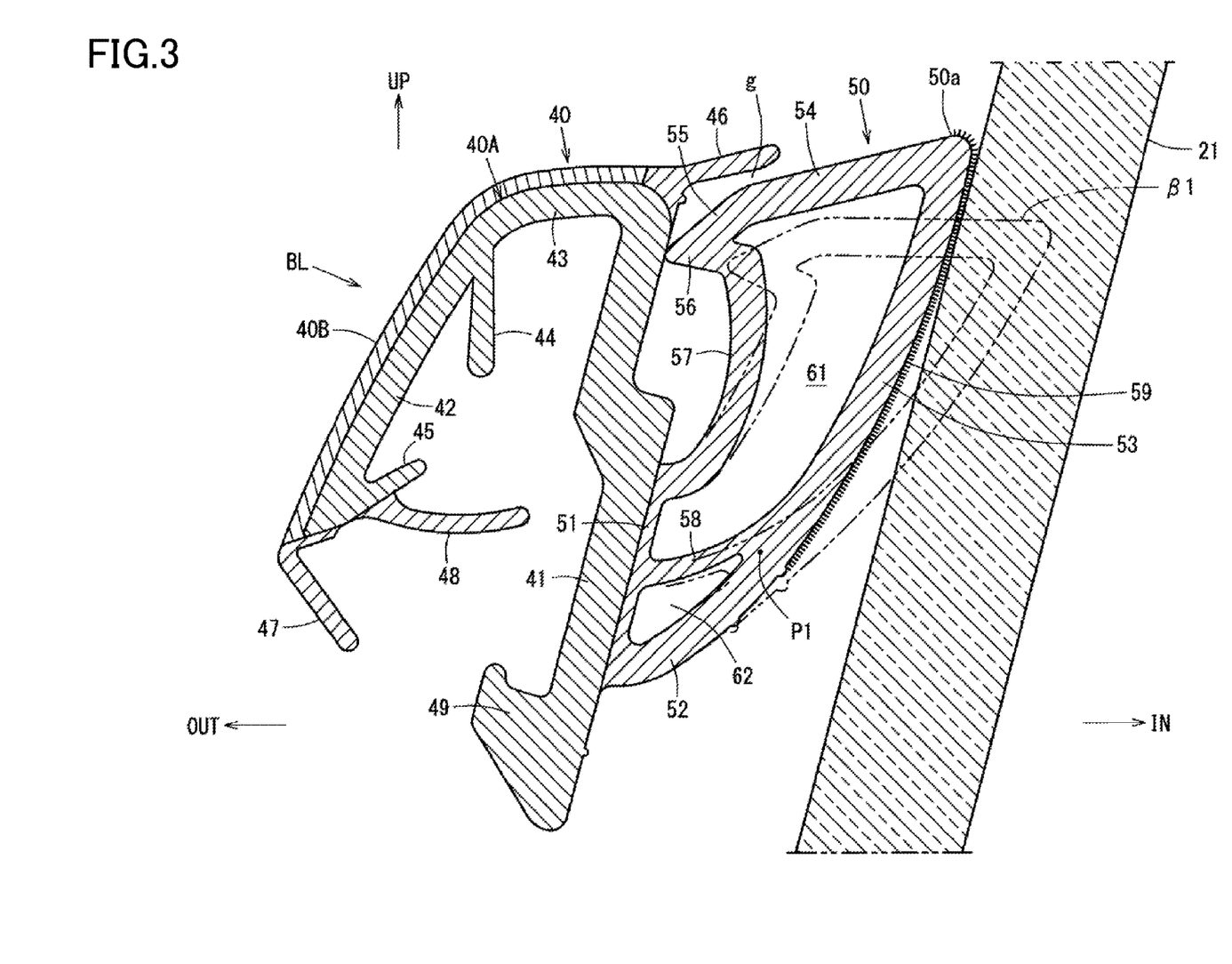
FIG. 3 is an enlarged view of a main portion of FIG. 2.

As illustrated in FIG. 2, the front door 11 includes the door outer panel 12 and a door inner panel 15. A belt line reinforcement outer 17 is provided inside the door outer panel 12 in a vehicle width direction, i.e., a door inner space 16 side, and an upper end portion of the door outer panel 12 and an upper end portion of the belt line reinforcement outer 17 are integrated together.

As illustrated in FIG. 2, on a door outer side, the upper end portions of both components 12, 17 are integrated at a so-called hemmed portion 18 at which the upper end portion of the door outer panel 12 is folded back from the outside to the inside of the belt line reinforcement outer 17 at an upper end thereof.

Moreover, as illustrated in FIG. 2, a belt line reinforcement inner 19 is provided outside the door inner panel 15 in the vehicle width direction, i.e., the door inner space 16 side, and an upper end portion of the door inner panel 15 and an upper end portion of the belt line reinforcement inner 19 are integrated together.

As illustrated in FIG. 2, on a door inner side, a joint flange portion 15a is formed integrally with the upper end portion of the door inner panel 15, and a joint flange portion 19a is also formed integrally with the upper end portion of the belt line reinforcement inner 19. These joint flange portions 15a, 19a are integrated together by a joint method such as spot welding. That is, on the door inner side, the upper end portions of both joint flange portions 15a, 19a are integrated together at a joint portion 20 between these portions 15a, 19a.

The door inner space 16 is formed between the belt line reinforcement outer 17 and the belt line reinforcement inner 19, and has an opening at the position of a belt line portion BL. A door window glass 21 is lifted from or lowered into the door inner space 16 through the opening at the position of the belt line portion BL by a not-shown window regulator.

The position of the lifted door window glass 21 is indicated by a sold line in FIG. 2, and the position of the lowered door window glass 21 is indicated by a virtual line α1 in FIG. 2.

As illustrated in FIG. 2, a resin door trim 23 is provided inside the door inner panel 15 in the vehicle width direction.

As illustrated in FIG. 2, an inner side weather strip 30 is attached to the joint portion 20 on the door inner side. The inner side weather strip 30 is provided across the substantially entire length of the joint portion 20 in a front-to-rear direction.

The inner side weather strip 30 has a vehicle inner side wall 31, a vehicle outer side wall 32, and a coupling portion 33 coupling upper end portions of both side walls 31, 32, and a main portion of the inner side weather strip 30 is formed with an inverted U-shaped section. A seal portion 34 extending upward and configured to seal between the joint portion 20 and a fold-back portion 23a positioned on an upper portion of the door trim 23 on a vehicle outer side is formed integrally with an intersection portion between the vehicle inner side wall 31 and the coupling portion 33.

Further, a protruding portion 35 extending downward from a lower end portion of the vehicle inner side wall 31 and serving as the function of determining the position of a lower end of the inner side weather strip 30 is formed integrally with the lower end portion of the vehicle inner side wall 31.

In addition, upper and lower seal portions 36, 37 having solid tongue-shaped sections, extending upward toward a door window glass 21 side, and configured to seal between the door window glass 21 and the joint portion 20 are formed integrally with the upper and lower end portions of the vehicle outer side wall 32.

As illustrated in FIG. 2, a molding portion 40 provided on the vehicle outer side of the belt line portion BL is attached to the hemmed portion 18 on the door outer side. The molding portion 40 is provided across the substantially entire length of the hemmed portion 18 in the front-to-rear direction.

As illustrated in the enlarged view of the main portion of FIG. 2 in FIG. 3, the molding portion 40 includes a molding body portion 40A as a resin (e.g., polypropylene) base portion, and a resin (e.g., polypropylene) skin portion 40B.

As illustrated in FIG. 3, the molding body portion 40A has a vehicle inner side wall 41, a vehicle outer side wall 42, and a coupling portion 43 coupling upper end portions of both side walls 41, 42, and a main portion of the molding body portion 40A is formed with an inverted U-shaped section. As illustrated in this figure, a rib 44 extending downward from an upper portion of an inner surface of the vehicle outer side wall 42 of the molding body portion 40A is formed integrally with the molding body portion 40A, and a rib 45 extending upward diagonally from an inner surface of a lower end portion of the vehicle outer side wall 42 toward the inside in the vehicle width direction is formed integrally with the molding body portion 40A.

Moreover, as illustrated in FIG. 3, a corner portion between the vehicle inner side wall 41 and the coupling portion 43, a lip portion 46 extending inward in the vehicle width direction from an inner end portion of an upper end of the skin portion 40B in the vehicle width direction, and a lip portion 47 extending downward from the lower end portion of the vehicle outer side wall 42 and a lower end portion of the skin portion 40B toward the inside in the vehicle width direction are formed integrally with the molding body portion 40A and the skin portion 40B. A lip portion 48 extending inward in the vehicle width direction from a lower surface of the rib 45 is formed integrally with the molding body portion 40A.

These lip portions 46, 47, 48 are made of olefin-based thermoplastic elastomer (TPO).

The rib 44 described herein is a contact rib configured to restrict movement of the molding portion 40 more than necessary. Moreover, the lip portion 47 is a lip configured to suppress lowering of the position of the molding portion 40. Further, the lip portion 48 is a lip configured to reduce inward deformation of the molding portion 40 in the vehicle width direction.

Further, as illustrated in FIG. 3, a hook portion 49 extending outward in the vehicle width direction from a lower end portion of the vehicle inner side wall 41 of the molding body portion 40A is formed integrally with the molding body portion 40A. As illustrated in FIG. 2, a lower inner end of the hemmed portion 18 in the vehicle width direction, i.e., a fold-back downwardly-extending lower end of the door outer panel 12, is locked at the hook portion 49.

The skin portion 40B is integrally provided continuous to an outer surface of the vehicle outer side wall 42 of the molding body portion 40A and an upper surface of the coupling portion 43 of the molding body portion 40A.

As illustrated in FIG. 3, an outer side weather strip 50 (a so-called draining lip) whose upper end portion as a tip end portion extends upward from a lower portion of the vehicle inner side wall 41 as a molding side base end portion toward the door window glass 21 is provided integrally with the molding portion 40.

In the present embodiment, the outer side weather strip 50 is made of olefin-based thermoplastic elastomer (TPO). The molding body portion 40A and the skin portion 40B made of polypropylene and the lip portions 46, 47, 48 and the outer side weather strip 50 made of TPO are formed integrally by coextrusion molding.

In FIG. 3, the shape of the outer side weather strip 50 upon lifting of the door window glass 21 is indicated by a solid line, and the shape of the outer side weather strip 50 when the door window glass 21 is lowered and housed in the door inner space 16 is indicated by a virtual line β1.

As illustrated in FIG. 3, the outer side weather strip 50 is formed with a hollow inner structure in such a manner that a base portion 51 joined to a lower portion of an inner surface of the vehicle inner side wall 41 of the molding body portion 40A in the vehicle width direction and extending in an upper-to-lower direction, outer wall portions 52, 53 extending upward from a lower end of the base portion 51 toward the inside in the vehicle width direction, a horizontal wall portion 54 extending outward in the vehicle width direction from an upper end of the outer wall portion 53, a slant portion 55 extending downward diagonally from an outer end of the horizontal wall portion 54 in the vehicle width direction, a stopper portion 56 formed integrally with an outer portion of the slant portion 55 in the vehicle width direction and configured to contact the upper end portion of the vehicle inner side wall 41 of the molding body portion 40A upon lifting of the door window glass 21, and an inner wall portion 57 coupling a lower portion of the stopper portion 56 and an upper portion of the base portion 51 in the upper-to-lower direction are integrally formed in an annular shape.

In addition, the outer side weather strip 50 is configured such that a first hollow portion 61 is formed from a base end portion (a lower end portion) to the upper end portion as the tip end portion and a substantially triangular second hollow portion 62 is formed below the first hollow portion 61 at the base end portion.

The second hollow portion 62 is provided below the first hollow portion 61 at the base end portion as described above. Thus, the pivot point P1 of the outer side weather strip 50 when the door window glass 21 is lifted from a state in which the door window glass 21 is housed in the door inner space 16 to come into contact with the outer side weather strip 50 is set as close to the door window glass 21 as possible, and is set to right above the second hollow portion 62. Accordingly, a pivot radius from the pivot point P1 to an upper end 50a of the outer side weather strip 50 is decreased, and a margin for lifting by pivoting of the upper end 50a of the outer side weather strip 50 upon lifting of the door window glass 21 is decreased. Thus, narrowing of sideward visibility is reduced, and worsening of appearance from the vehicle outer side is prevented.

Figure 4:
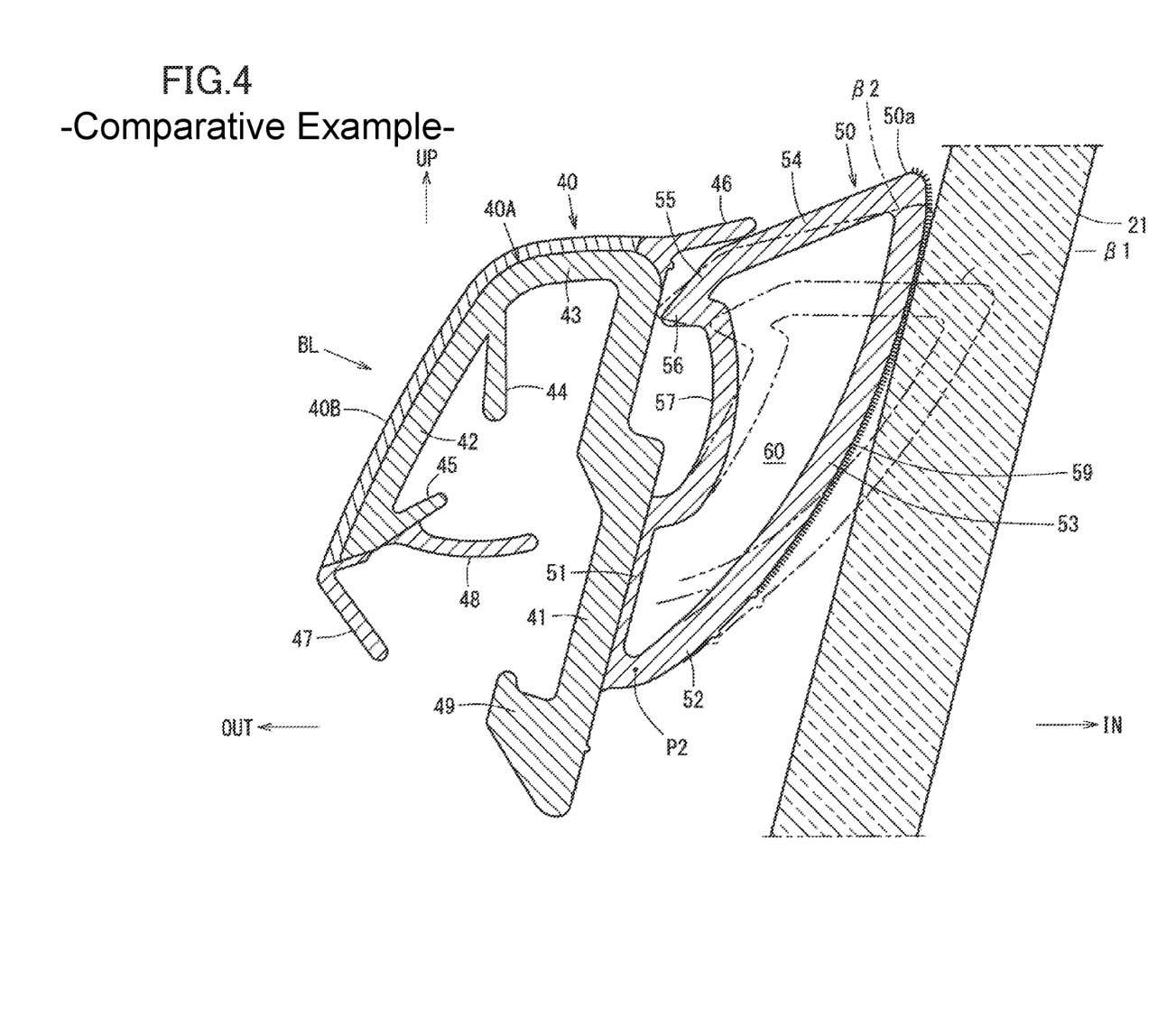
FIG. 4 is a sectional view of a comparison example of the seal structure of the vehicle door.

A structure of a comparison example compared with the embodiment illustrated in FIG. 3 is illustrated in FIG. 4.

In the comparison example illustrated in FIG. 4, no second hollow portion 62 is formed at all, and a single continuous hollow portion 60 extending in the upper-to-lower direction from a base end to a tip end of the outer side weather strip 50 is formed in the outer side weather strip 50. Note that the same reference numerals as those of FIG. 3 are used to represent equivalent elements in FIG. 4.

No second hollow portion 62 is present in the structure of the comparison example illustrated in FIG. 4, and therefore, the pivot point P2 of the outer side weather strip 50 is set to a lower portion of the base end portion of the outer side weather strip 50. As a result, a pivot radius from the pivot point P2 to the upper end 50*a* of the outer side weather strip 50 is larger as compared to that of the structure of the embodiment of FIG. 3, and a margin for lifting by pivoting of the upper end 50*a* of the outer side weather strip 50 upon lifting of the door window glass 21 becomes larger.

In FIG. 4, a virtual line β2 indicates the position of the outer side weather strip 50 upon lifting of the door window glass 21 in the embodiment illustrated in FIG. 3. As compared to the pivot point P2 of the comparison example illustrated in FIG. 4, the pivot point P1 of the embodiment illustrated in FIG. 3 is positioned closer to the door window glass 21, and is positioned higher in the upper-to-lower direction. Thus, it is obvious that the lifting margin for the upper end of the outer side weather strip 50 of the embodiment indicated by the virtual line β2 in FIG. 4 is smaller than the lifting margin for the upper end of the outer side weather strip 50 of the comparison example indicated by a solid line in FIG. 4.

As illustrated in FIG. 3, the second hollow portion 62 of the present embodiment is formed in a tapered shape from a base end portion (a lower end portion) to a tip end portion. In the present embodiment, the second hollow portion 62 is formed in the substantially triangular shape, and is formed such that the angle of the tip end portion formed in the tapered shape changes with a range of 21 degrees to 27 degrees upon lifting/lowering of the door window glass 21 (when the door window glass 21 is lifted/lowered between a state in which the door window glass 21 is housed in the door inner space 16 and a state in which the door window glass 21 contacts the outer side weather strip 50). With this configuration, stiffness of the tip end portion of the second hollow portion 62 in the outer side weather strip 50 is improved, and the outer side weather strip 50 turns about such a portion (see the pivot point P1).

As illustrated in FIG. 3, a partition wall portion 58 separating the first hollow portion 61 and the second hollow portion 62 in the upper-to-lower direction is formed integrally with the outer side weather strip 50. Moreover, the partition wall portion 58 is in such a curved shape that the partition wall portion 58 extends upward toward the door window glass 21 from an outer end portion in the vehicle width direction as a base end portion to an inner end portion in the vehicle width direction as a tip end portion.

Thus, in lifting of the door window glass 21, when outward biasing force in the vehicle width direction is applied to the door window glass 21, the partition wall portion 58 does not interfere with a certain degree of upward deformation of the tip end portion of the second hollow portion 62 in the outer side weather strip 50.

The point that the outward biasing force in the vehicle width direction is applied to the door window glass 21 upon lifting of the door window glass 21 is because of the following reasons.

That is, the door window glass 21 is arranged inclined slightly such that a lower end portion is positioned outside in the vehicle width direction with respect to an upper end. When the door window glass 21 is lifted such that the upper end contacts a corresponding upper door sash and the lower end portion of the door window glass 21 is pressed upward by the window regulator (not shown), the outward biasing force in the vehicle width direction is applied to the door window glass 21.

As illustrated in FIG. 3, the lower outer wall portion 52 of the outer wall portions 52, 53 in the upper-to-lower direction is positioned close to the door window glass 21 with respect to the second hollow portion 62, and the upper outer wall portion 53 of the outer wall portions 52, 53 in the upper-to-lower direction is positioned close to the door window glass 21 with respect to the first hollow portion 61.

Moreover, the thickness of the partition wall portion 58 is equal to or less than the thickness of the outer wall portion 53, 52 positioned close to the door window glass 21 with respect to the hollow portion 61, 62, and the partition wall portion 58 is preferably formed thin. In the present embodiment, the thickness of the partition wall portion 58 is set to the substantially half of the thickness of the outer wall portion 53, 52. With this configuration, an excessive increase in stiffness of a base end side of the outer side weather strip 50, specifically the vicinity of the second hollow portion 62, is suppressed.

Further, as illustrated in FIG. 3, the horizontal wall portion 54 extending substantially horizontally in the vehicle width direction is formed integrally with an upper end of the first hollow portion 61, and the stopper portion 56 protruding toward the molding portion 40 (toward the vehicle inner side wall 41 of the molding body portion 40A) is, through the slant portion 55, formed at an end portion of the horizontal wall portion 54 on the vehicle outer side.

With this configuration, when the outer side weather strip 50 pivots about the pivot point P1, the stopper portion 56 contacts the molding portion 40, and the force of pressing the door window glass 21 by the outer side weather strip 50 is obtained, as illustrated in FIG. 3. This suppresses water from entering the door inner space 16 (see FIG. 2).

In addition, as illustrated in FIG. 3, the upper end 50*a* (note that the upper end 50*a* when the outer side weather strip 50 contacts the door window glass 21) of the outer side weather strip 50 is set at the substantially same height as that of an upper end portion (see an upper inner end of the lip portion 46 in the vehicle width direction) of the molding portion 40. With this configuration, there is almost no upward protrusion of the upper end 50*a* of the outer side weather strip 50 beyond the belt line portion BL. Thus, worsening of downward visibility (the so-called sideward visibility) from the inside of a vehicle compartment to the vehicle outer side is suppressed, and appearance from the vehicle outer side is improved.

In addition, as illustrated in FIG. 3, the minimum clearance such as a clearance g of about 0.5 mm is formed between an upper surface of the horizontal wall portion 54 of the outer side weather strip 50 and a lower surface of the lip portion 46. For preventing the lip portion 46 from turning up due to variation upon manufacturing of the outer side weather strip 50, the slant portion 55 is formed with a downward slope toward the outside in the vehicle width direction with respect to the horizontal wall portion 54 and with a steep downward slope. The clearance g is preferably 0.0 mm under normal conditions. However, for preventing turning up of the lip portion 46 due to variation upon manufacturing, the clearance g is formed as described above.

Moreover, as illustrated in FIG. 3, a noise prevention layer 59 is, by hair implantation, formed on a surface of the outer side weather strip 50 contacting the door window glass 21, i.e., a surface of the outer wall portion 53 close to the door window glass 21. The noise prevention layer 59 prevents occurrence of noise when the outer side weather strip 50 is somewhat caught by the door window glass 21 upon lowering of the door window glass 21. Note that in FIG. 2, the noise prevention layer 59 is not shown for the sake of convenience.

Note that in the figure, an arrow F indicates a vehicle front side, an arrow R indicates a vehicle rear side, an arrow IN indicates the inside in the vehicle width direction, an arrow OUT indicates the outside in the vehicle width direction, and an arrow UP indicates a vehicle upper side.

As described above, the seal structure of the vehicle door of the first embodiment as illustrated in FIGS. 1 to 3 is the vehicle door seal structure in which the outer side weather strip 50 whose tip end portion extends upward from the molding side base end portion toward the door window glass 21 is provided integrally with the molding portion 40 provided on the vehicle outer side of the belt line portion BL. At least the outer side weather strip 50 (in the present embodiment, only the single outer side weather strip 50 is provided, and therefore, the outer side weather strip 50 is at least the outer side weather strip positioned at the uppermost portion; but even in a case where a lip extending upward from the lower portion of the vehicle inner side wall 41 toward the door window glass 21 is separately provided below the outer side weather strip 50 illustrated in FIG. 3, the outer side weather strip 50 is at least the outer side weather strip positioned at the uppermost portion) positioned at the uppermost portion is configured such that the first hollow portion 61 is formed from the base end portion to the tip end portion and the second hollow portion 62 is formed below the first hollow portion 61 at the base end portion (see FIG. 3).

According to this configuration, the second hollow portion 62 is provided below the first hollow portion 61 at the base end portion. Thus, the pivot point P1 of the outer side weather strip 50 upon lifting of the door window glass 21 can be set to right above the second hollow portion 62, and accordingly, the pivot radius from the pivot point P1 to the upper end 50a of the outer side weather strip 50 is decreased.

Thus, the margin for lifting of the upper end 50a of the outer side weather strip 50 upon lifting of the door window glass 21 can be decreased, and narrowing of the sideward visibility can be suppressed. In addition, worsening of appearance from the vehicle outer side can be prevented.

Moreover, in one embodiment of the present invention, the second hollow portion 62 is formed in the tapered shape from the base end portion to the tip end portion (see FIG. 3).

According to this configuration, the stiffness of the tip end portion of the second hollow portion 62 in the outer side weather strip 50 can be improved, and therefore, the outer side weather strip 50 can turn about such a portion (the pivot point P1).

Further, in one embodiment of the present invention, the partition wall portion 58 separating the first hollow portion 61 and the second hollow portion 62 extends upward toward the door window glass 21 from the base end portion to the tip end portion (see FIG. 3).

According to this configuration, the following advantageous effects are provided.

That is, the door window glass 21 is arranged inclined slightly such that the lower end portion is positioned outside in the vehicle width direction with respect to the upper end. When the door window glass 21 is lifted such that the upper end contacts the corresponding upper door sash and the lower end portion of the door window glass 21 is pressed upward by the window regulator, the outward biasing force in the vehicle width direction is applied to the door window glass 21.

The partition wall portion 58 extends upward toward the door window glass 21 from the base end portion to the tip end portion. Thus, in lifting of the door window glass 21, when the outward biasing force in the vehicle width direction as described above is applied to the door window glass 21, the partition wall portion 58 does not interfere with a certain degree of upward deformation of the tip end portion of the second hollow portion 62 in the outer side weather strip 50.

In addition, in one embodiment of the present invention, the thickness of the partition wall portion 58 is equal to or less than the thickness of the outer wall portion 53, 52 positioned close to the door window glass 21 with respect to the hollow portion 61, 62, and the partition wall portion 58 is preferably formed thin (see FIG. 3).

According to this configuration, the thickness of the partition wall portion 58 is set as described above, and therefore, the excessive increase in the stiffness of the base end side of the outer side weather strip 50, specifically the vicinity of the second hollow portion 62, can be suppressed.

Moreover, in one embodiment of the present invention, the horizontal wall portion 54 extending substantially horizontally in the vehicle width direction is formed at the upper end of the first hollow portion 61, and the stopper portion 56 protruding toward the molding portion 40 is formed at the end portion of the horizontal wall portion 54 on the vehicle outer side (see FIG. 3).

According to this configuration, when the outer side weather strip 50 pivots about the pivot point P1, the stopper portion 56 contacts the molding portion 40, and the force of pressing the door window glass 21 by the outer side weather strip 50 is obtained.

Further, in one embodiment of the present invention, the upper end 50a of the outer side weather strip 50 is set at the substantially same height as that of the upper end portion of the molding portion 40 (see FIG. 3).

According to this configuration, there is almost no upward protrusion of the upper end 50a of the outer side weather strip 50 beyond the belt line portion BL. Thus, worsening of the downward visibility (the so-called sideward visibility) from the inside of the vehicle compartment to the vehicle outer side can be suppressed, and appearance from the vehicle outer side can be improved.

Second Embodiment

Figure 5:
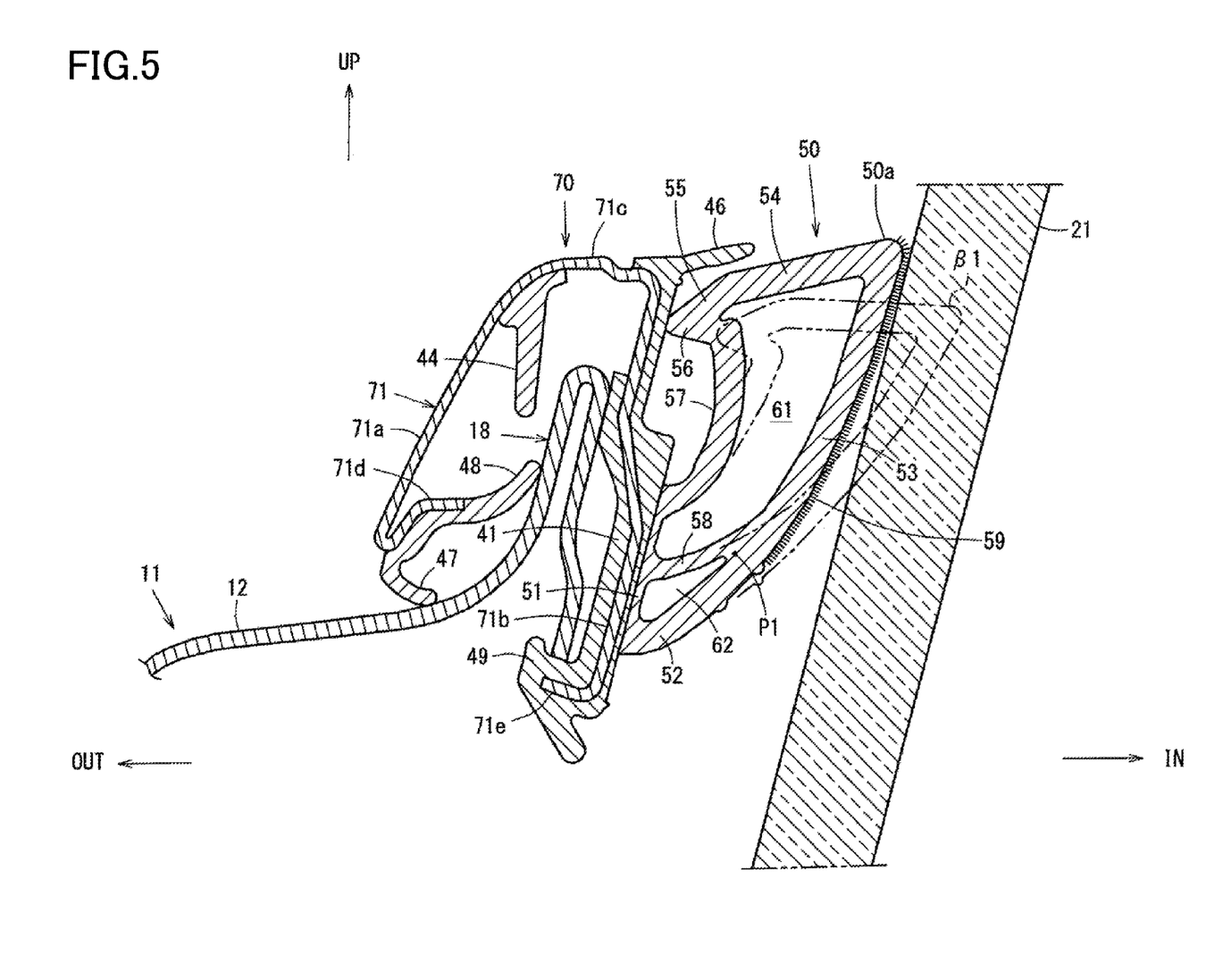
FIG. 5 is a sectional view of another embodiment of the seal structure of the vehicle door.

FIG. 5 is a sectional view of another embodiment of the seal structure of the vehicle door.

In a second embodiment illustrated in FIG. 5, the same reference numerals as those of the first embodiment illustrated in FIGS. 1 to 3 are used to represent identical or equivalent elements.

In the second embodiment illustrated in FIG. 5, a molding portion 70 includes a metal molding body 71 and a resin (e.g., polypropylene) vehicle inner side wall 41.

The molding body 71 is made of metal such as stainless steel providing an excellent antirust effect for the purpose of ensuring brilliancy. Moreover, the molding body 71 includes a vehicle outer side wall 71a, a vehicle inner side wall 71b, and a coupling portion 71c coupling upper end portions of both wall portions 71a, 71b, and a main portion of the molding body 71 is formed with an inverted U-shaped section.

Further, a bent piece 71d extending inward in the vehicle width direction after having extended upward from a lower end of the vehicle outer side wall 71a is formed integrally with the vehicle outer side wall 71a of the molding body 71.

In addition, a bent piece 71e extending outward in the vehicle width direction from a lower end of the vehicle inner side wall 71b is formed integrally with the vehicle inner side wall 71b of the molding body 71.

A lip portion 46 extending inward in the vehicle width direction is formed integrally with an upper end of the resin vehicle inner side wall 41, and a hook portion 49 protruding outward in the vehicle width direction is formed integrally with a lower end portion of the vehicle inner side wall 41.

The vehicle inner side wall 71*b* and the bent piece 71*e* of the molding body 71 are inserted into the resin vehicle inner side wall 41 and the hook portion 49.

Further, a resin rib 44 extending downward from a corner portion between the vehicle outer side wall 71*a* and the coupling portion 71*c* of the molding body 71 is formed integrally with the corner portion, a TPO lip portion 48 extending inward in the vehicle width direction from an inner end portion of the bent piece 71*d* of the molding body 71 is formed integrally with the inner end portion of the bent piece 71*d*, and a TPO lip portion 47 extending inward and downward in the vehicle width direction from a lower end portion of the bent piece 71*d* of the molding body 71 is formed integrally with the lower end portion of the bent piece 71*d*.

In the second embodiment illustrated in FIG. 5, a configuration of an outer side weather strip 50 whose tip end portion extends upward from a lower portion of the vehicle inner side wall 41 as a molding side base end portion toward a door window glass 21 is the same as the structure of the outer side weather strip 50 of the first embodiment illustrated in FIG. 3. Thus, features and advantageous effects similar to those of the first embodiment are also provided in the second embodiment.

Note that in the first embodiment illustrated in FIG. 3, the molding body portion 40A and the skin portion 40B are made of polypropylene, and the lip portions 46, 47, 48 and the outer side weather strip 50 are made of olefin-based thermoplastic elastomer. Moreover, in the second embodiment illustrated in FIG. 5, the molding body 71 is made of stainless steel, the vehicle inner side wall 41 and the rib 44 are made of polypropylene, the lip portions 47, 48 and the outer side weather strip 50 are made of olefin-based thermoplastic elastomer. However, these materials are examples, and the present invention is not limited to these materials.

As described above, the present invention is useful for a vehicle door seal structure in which an outer side weather strip whose tip end portion extends upward from a molding side base end portion to a door window glass is formed integrally with a molding portion provided on a vehicle outer side of a belt line portion.

What is claimed is:

1. A vehicle door seal structure comprising:
a molding portion provided on a vehicle outer side of a belt line portion; and
at least one outer side weather strip provided integrally with the molding portion and having a tip end portion extending upward from a molding side base end portion toward a door window glass, wherein
the at least one outer side weather strip, positioned at an uppermost portion, includes a first hollow portion extending from the base end portion to the tip end portion and being located substantially above a second hollow portion, the second hollow portion being below the first hollow portion at the base end portion, and a partition wall portion extending substantially horizontally between and separating the first hollow portion and the second hollow portion in an upper-to-lower direction of the vehicle, and
in the upper-to-lower direction of the vehicle, the first hollow portion is located above the second hollow portion with the partition wall portion interposed between the first hollow portion and the second hollow portion.

2. The vehicle door seal structure according to claim 1, wherein
the second hollow portion is formed in a tapered shape from the base end portion to the tip end portion.

3. The vehicle door seal structure according to claim 1, wherein
the partition wall portion separating the first hollow portion and the second hollow portion extends upward toward the door window glass from the base end portion to a tip end portion of the second hollow portion.

4. The vehicle door seal structure according to claim 2, wherein
the partition wall portion separating the first hollow portion and the second hollow portion extends upward toward the door window glass from the base end portion to a tip end portion of the second hollow portion.

5. The vehicle door seal structure according to claim 3, wherein
a thickness of the partition wall portion is formed thinner than a thickness of an outer wall portion positioned on a door window glass side of each hollow portion.

6. The vehicle door seal structure according to claim 4, wherein
a thickness of the partition wall portion is formed thinner than a thickness of an outer wall portion positioned on a door window glass side of each hollow portion.

7. The vehicle door seal structure according to claim 1, wherein
the at least one outer side weather strip includes, at an upper end of the first hollow portion, a horizontal wall portion extending substantially horizontally in a vehicle width direction, and includes, at an end portion of the horizontal wall portion on the vehicle outer side, a stopper portion protruding toward the molding portion.

8. The vehicle door seal structure according to claim 1, wherein
an upper end of the at least one outer side weather strip is set at a height substantially identical to that of an upper end portion of the molding portion.

9. The vehicle door seal structure according to claim 1, wherein
an intersection of the partition wall portion and an outer wall portion of the at least one outer side weather strip close to the door window glass serves as a pivot point of the at least one outer side weather strip when the door window glass comes into contact with the at least one outer side weather strip.

10. The vehicle door seal structure according to claim 1, wherein
the second hollow portion has a substantially triangular shape.

11. The vehicle door seal structure according to claim 3, wherein
the partition wall portion is in such a curved shape that the partition wall portion extends upward toward the door window glass from the base end portion.

12. The vehicle door seal structure according to claim 4, wherein
the partition wall portion is in such a curved shape that the partition wall portion extends upward toward the door window glass from the base end portion.

13. The vehicle door seal structure according to claim 1, wherein
- a noise prevention layer is, by hair implantation, formed on a surface of a portion of the outer wall portion, the portion being at the first hollow portion and being close to the door window glass.

14. The vehicle door seal structure according to claim 1, wherein
- the at least one outer side weather strip includes:
    - a base portion joined to a lower portion of an inner surface of a vehicle inner side wall of the molding portion in a vehicle width direction and extending in the upper-to-lower direction of the vehicle;
    - an outer wall portion extending upward from a lower end of the base portion toward the inside in the vehicle width direction; and
    - a horizontal wall portion extending outward in the vehicle width direction from an upper end of the outer wall portion, and
- the horizontal wall portion, the first hollow portion, the partition wall portion, and the second hollow portion are sequentially arranged from above in the upper-to-lower direction of the vehicle.

\* \* \* \* \*